United States Patent
Yoon et al.

(10) Patent No.: US 7,466,666 B2
(45) Date of Patent: Dec. 16, 2008

(54) FORWARD ACK/NACK CHANNEL FOR CDMA SYSTEM

(75) Inventors: Young C. Yoon, San Diego, CA (US); Shiau-He Shawn Tsai, San Diego, CA (US); Anthony C. K. Soong, Superior, CO (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 968 days.

(21) Appl. No.: 10/769,010

(22) Filed: Jan. 30, 2004

(65) Prior Publication Data

US 2004/0258096 A1   Dec. 23, 2004

Related U.S. Application Data

(60) Provisional application No. 60/479,552, filed on Jun. 18, 2003.

(51) Int. Cl.
*H04B 1/00* (2006.01)
*H04J 3/00* (2006.01)
*H04B 7/216* (2006.01)

(52) U.S. Cl. .................. 370/278; 370/477; 455/69; 455/522

(58) Field of Classification Search ......... 370/228–231, 370/235, 236, 280, 282, 294, 314, 320–322, 370/335, 342, 441, 477, 277; 455/68, 69, 455/515, 522
See application file for complete search history.

(56) References Cited

U.S. PATENT DOCUMENTS

| | | | |
|---|---|---|---|
| 6,694,469 B1 * | 2/2004 | Jalali et al. | 714/748 |
| 6,717,924 B2 * | 4/2004 | Ho et al. | 370/311 |
| 6,954,448 B2 * | 10/2005 | Farley et al. | 370/337 |
| 7,155,236 B2 * | 12/2006 | Chen et al. | 455/454 |
| 7,185,256 B2 * | 2/2007 | Miki et al. | 714/751 |
| 7,206,280 B1 * | 4/2007 | Khan et al. | 370/216 |
| 7,346,314 B2 * | 3/2008 | Tsai et al. | 455/69 |
| 2002/0154610 A1 * | 10/2002 | Tiedemann et al. | 370/329 |
| 2002/0176362 A1 * | 11/2002 | Yun et al. | 370/236 |
| 2003/0099211 A1 * | 5/2003 | Moulsley et al. | 370/328 |
| 2003/0126238 A1 * | 7/2003 | Kohno et al. | 709/220 |
| 2004/0141525 A1 * | 7/2004 | Bhushan et al. | 370/473 |
| 2004/0160914 A1 * | 8/2004 | Sarkar | 370/329 |
| 2004/0160984 A1 * | 8/2004 | Sidhushayana et al. | 370/474 |
| 2005/0135320 A1 * | 6/2005 | Tiedemann et al. | 370/338 |
| 2006/0128410 A1 * | 6/2006 | Derryberry et al. | 455/509 |

FOREIGN PATENT DOCUMENTS

| | | |
|---|---|---|
| WO | WO01/80477 | 10/2001 |
| WO | WO 03/034611 | 4/2003 |

\* cited by examiner

*Primary Examiner*—Chi H Pham
*Assistant Examiner*—Ahmed Elallam
(74) *Attorney, Agent, or Firm*—Coats & Bennett, P.L.L.C.

(57) ABSTRACT

A base station receives data frames from a mobile station and selectively gates a physical layer radio channel to provide ACK and NACK indications responsive to the receipt of the data frames from the mobile station. The physical layer radio channel is gated on to provide one of an ACK and a NACK indication to the mobile station, and is gated off to provide the other one of the ACK and NACK indications to the mobile station.

13 Claims, 5 Drawing Sheets

FORWARD ACK/NACK CHANNEL FOR CDMA SYSTEM

RELATED APPLICATIONS

This application claims priority under 35 U.S.C. § 119(e) from the following provisional application: Application Ser. No. 60/479,552 filed on Jun. 18, 2003. That application is incorporated in its entirety by reference herein.

BACKGROUND OF THE INVENTION

The present invention generally relates to automatic repeat request in a wireless communication system, and more particularly to a Forward ACK channel for transmitting ACK/NACK indications responsive to data frames transmitted on a reverse packet data channel.

The purpose of a communication system is to transmit information from an information source to a destination over a communication channel. In wireless communication systems, noise and multipath fading cause bit errors to occur during transmission. Numerous error control techniques are used to combat interference and reduce bit errors. Most error control techniques introduce controlled redundancy into the information transmitted over the communication channel that can be used at the destination to detect and possibly correct bit errors that may occur during transmission. Two commonly used error control techniques are automatic repeat request (ARQ) and forward error correction (FEC).

The basic principle underlying ARQ is to add redundant bits or check bits to a message that allows detection of errors at the receiver. If the receiver detects errors in the received message, the receiver can request a repeat transmission of the message. Retransmissions are typically at the same data transmission rate as the original transmission. The number of retransmissions may be limited to a predetermined maximum number. ARQ is simple and achieves reasonable throughput when the error rate is low. Throughput diminishes, however, as the error rate increases because of the need to resend data.

FEC uses error-correcting codes to combat errors by adding redundancy to information before it is transmitted. The added redundancy enables the receiver to detect and correct most errors that occur during transmission. A receiver with knowledge of the error correcting code can detect and correct most bit errors. Examples of FEC codes include block codes, convolutional codes, and turbo codes.

Hybrid ARQ (HARQ) is another error control technique that combines ARQ and FEC. HARQ has been adopted for high-speed packet data (HSPD) channels to further enhance robustness against link adaptation errors. Using HARQ, messages are coded twice using an inner code and an outer code. The inner code may, for example, comprise a Cyclic Redundancy Check (CRC) code that is appended to the information bits prior to transmission to form a protected message. The protected message is then coded using FEC, for example, a convolutional code or turbo code associated with FEC. Both the information bits and CRC bits are coded. The coded message is then transmitted to a receiving terminal, which decodes the message and performs a CRC check. If the number of errors in the message is within the capabilities of the error correction code, the errors will be corrected without the need for retransmission. Only if the number of errors in the message exceeds the capabilities of the error correcting code will retransmission be requested.

When ARQ or HARQ are used on a reverse link channel, there needs to be some method of transmitting ACK/NACK indications from the base station to the mobile terminal. Conventionally, ACK/NACK indications are transmitted using binary phase shift keying (BPSK). With BPSK, the phase of the signal is varied to ACK or NACK a mobile station transmission on the reverse link channel.

SUMMARY OF THE INVENTION

The present invention relates to a method of automatic repeat request in a wireless communication system. A radio base station receives data frames from a mobile station transmitting on a reverse packet data channel. Acknowledgements of the data frames are sent over an ACK subchannel. The ACK subchannel is time multiplexed and includes a plurality of time slots. Each mobile station is assigned one or more time slots on the ACK subchannel. The radio base station acknowledges receipt of a data frame by sending a signal in a corresponding time slot of the ACK subchannel when the data frame is properly decoded. When a data frame is not or cannot be properly decoded, the base station does not transmit in the allocated time slot for the mobile station. Thus, a positive acknowledgement is indicated by the presence of energy in the allocated time slot above a predetermined threshold, and a negative acknowledgement is indicated by energy below the predetermined threshold. The acknowledgement may be repeated a predetermined number of times to reduce the number of false acknowledgements.

DETAILED DESCRIPTION OF THE INVENTION

Figure 1:
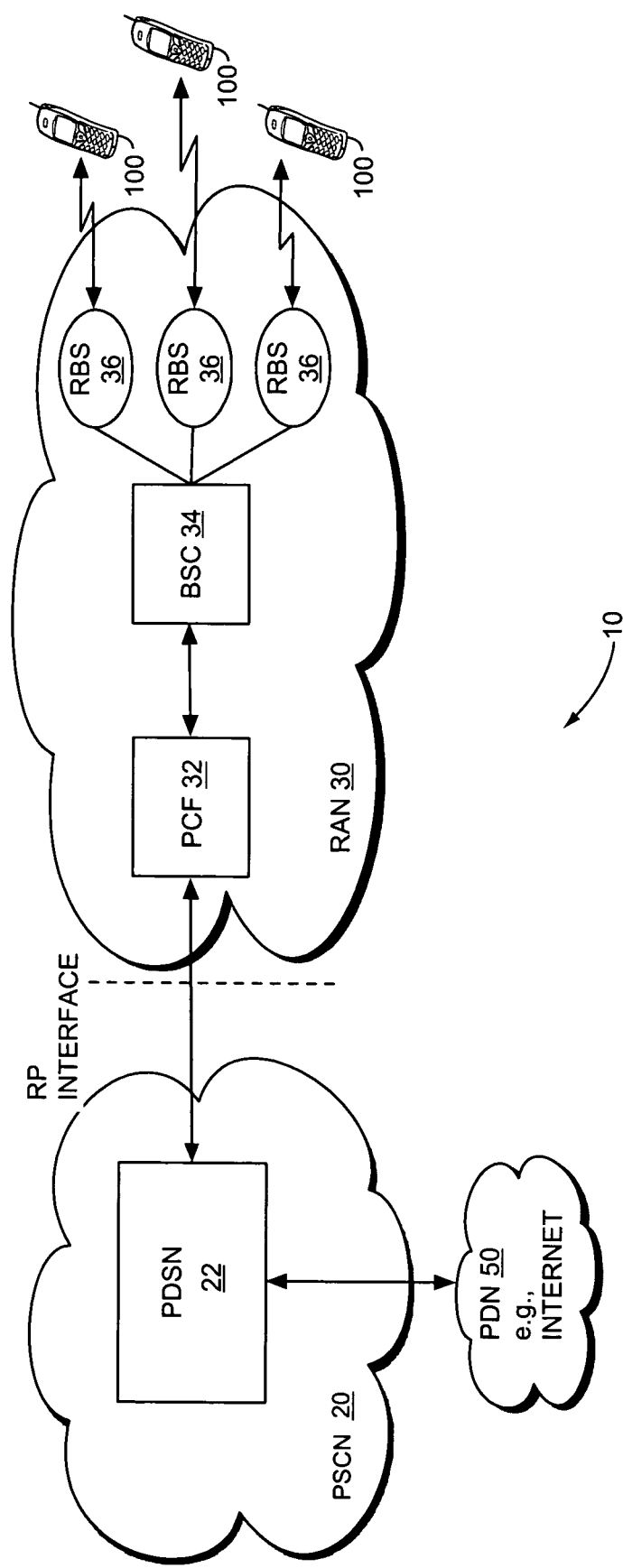
FIG. 1 is a block diagram of a wireless communication network.

Turning to the drawings, FIG. 1 illustrates an exemplary wireless communication network 10 in which the present invention may be implemented. Network 10 may be any packet-switched communication network, for example, a cdma2000 wireless network according to the IS-2000/2001 families of standards. However, those skilled in the art will appreciate that the wireless communication network may be configured according to other standards, such as Wideband CDMA (WCDMA) standards, for example.

Network 10 includes a Packet-Switched Core Network (PSCN) 20 and a Radio Access Network (RAN) 30. The PSCN 20 includes a packet data serving node (PDSN) and provides connection to one or more Public Data Networks (PDNs) 50, such as the Internet. The details of the PSCN 20 are not material to the present invention and, therefore, the PSCN 20 is not discussed further herein.

The RAN 30 provides the radio interface between the mobile stations 100 and the PCSN 20. An exemplary RAN 30 comprises a Packet Control Function (PCF) 32, one or more Base Station Controllers (BSC) 34, and a plurality of Radio Base Stations (RBSS) 36. BSCs 34 connect the RBSs 36 to the PCF 32 and manage the communication resources for the RBS 36. Mobile stations 100 communicate with the RBSs 36 via the air interface as defined by the appropriate network standards, such as the IS-2000 family of standards.

Figure 2:
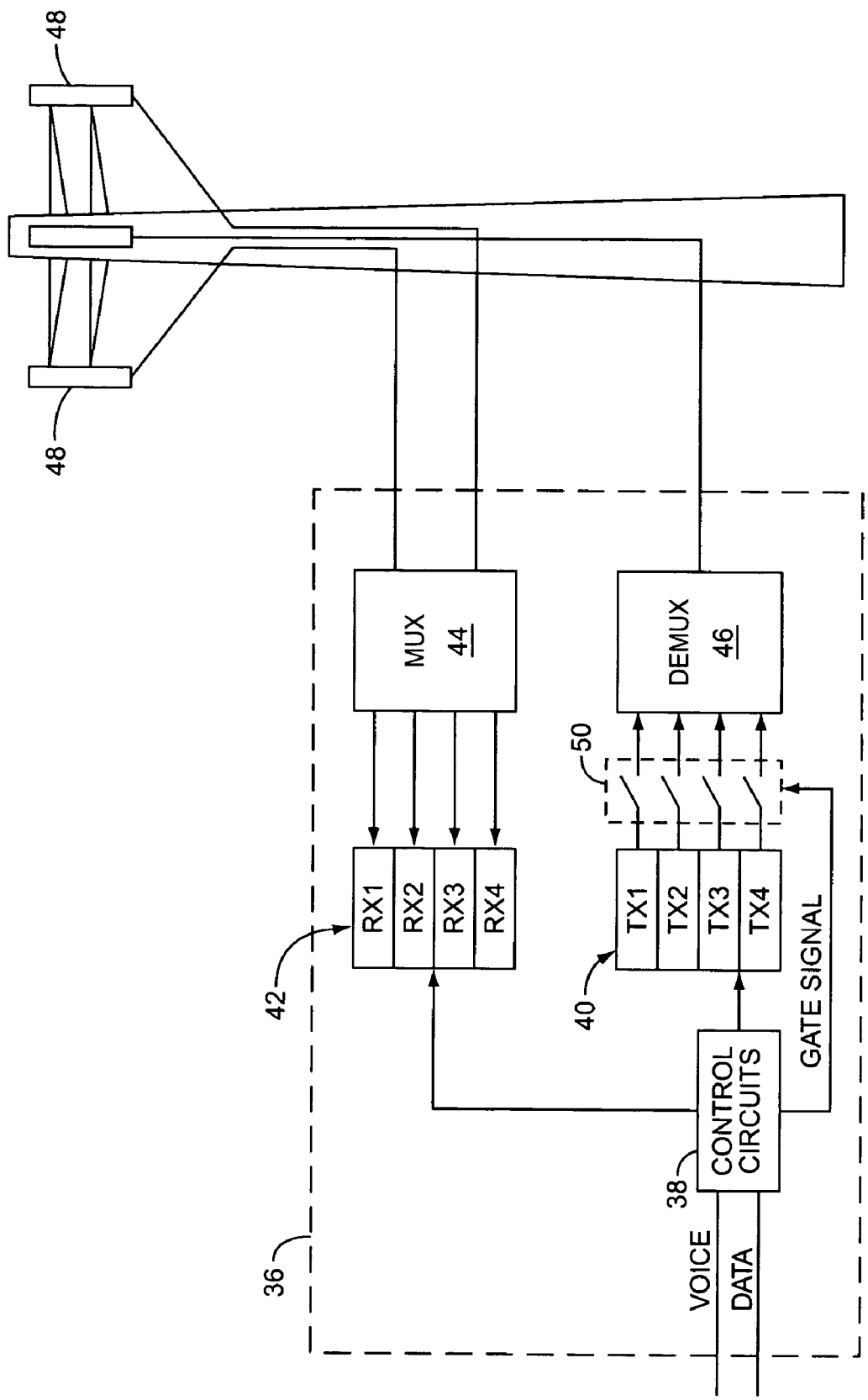
FIG. 2 is a block diagram of a radio base station.

FIG. 2 illustrates a functional diagram of an exemplary RBS 36 according to one embodiment of the present invention. The radio base station 36 includes control circuits 38, a plurality of transmitters 40 and receivers 42, a multiplexer 44, a demultiplexer 46 and one or more transmit and receive antennas 48. The control circuits 38 control the operation of the RBS 36. Signals received by receive antennas 48 from mobile stations 100 are demultiplexed by demultiplexer 46 and fed to the receivers 42 for processing. Signals transmitted by the RBS 36 are combined by the multiplexer 30 and applied to transmit antennas 48. Gating circuits 50 enable the control circuits 38 to selectively turn the transmitters 40 on and off as will be described in greater detail below. The gating circuits 50 may be coupled to the output of the transmitters 40, or alternatively, may interrupt the power supply to the transmitters 40. The functional elements of FIG. 2 may be implemented in software, hardware, or some combination of both. For example, one or more of the functional elements in RBS 36 may be implemented as stored program instructions executed by one or more microprocessors or other logic circuits included in RBS 36.

Figure 3:
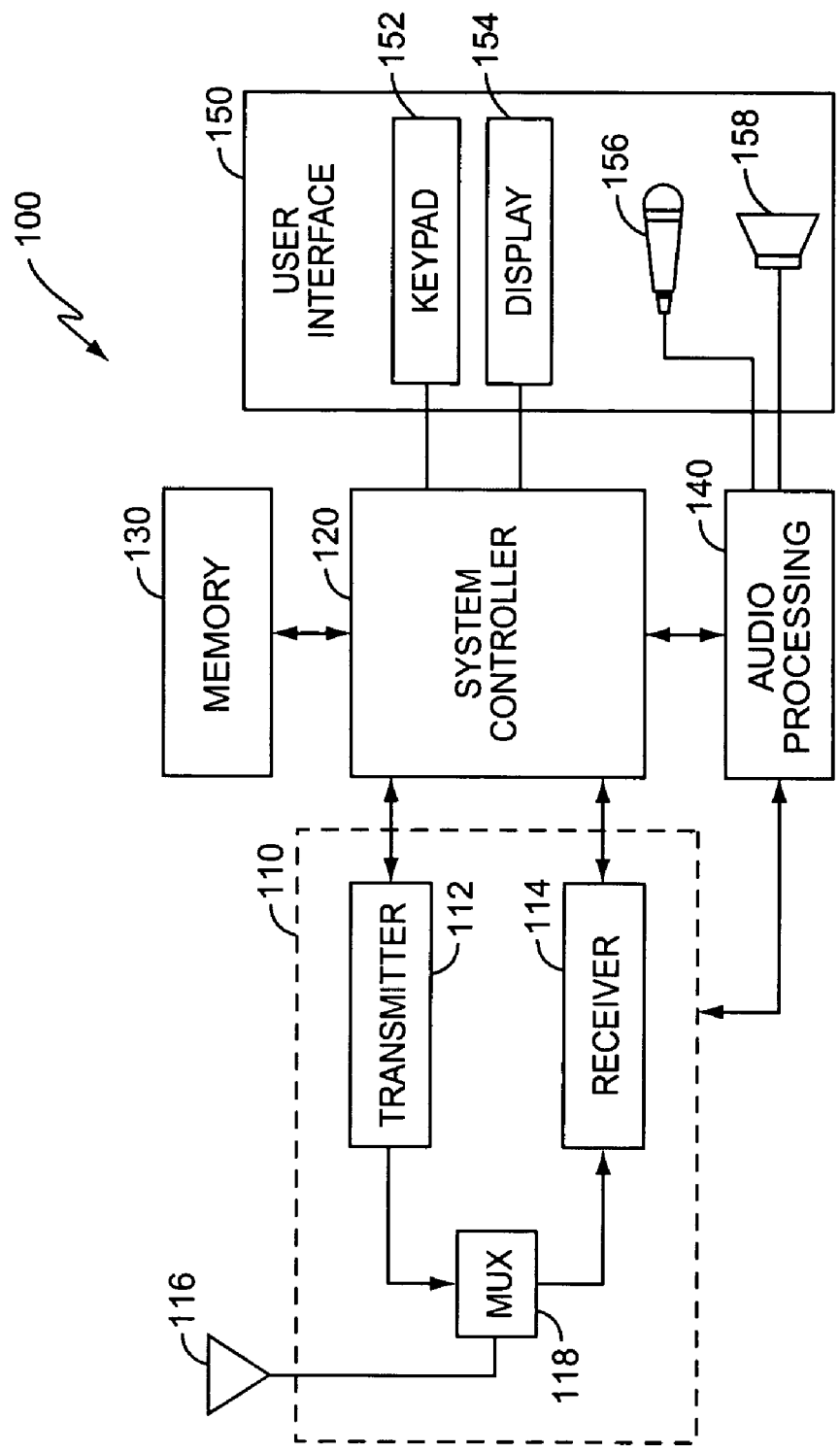
FIG. 3 is a block diagram of a mobile station.

FIG. 3 is a functional block diagram of an exemplary mobile station 100 according to one embodiment of the present invention. As used herein, the term "mobile station" may include a cellular radiotelephone, a Personal Communications System (PCS) terminal that may combine a cellular radiotelephone with data processing, facsimile, and data communications capabilities; a Personal Data Assistant (PDA) that may include a pager, Web browser, radiotelephone, Internet/intranet access, organizer, calendar, and a conventional laptop and/or palmtop receiver or other appliances that include a radiotelephone transceiver.

Mobile station 100 includes a transceiver 110 connected to an antenna 116 via a multiplexer 118 as known in the art. Mobile station 100 further includes a system controller 120, memory 130, an audio processing circuit 140, and a user interface 150. Transceiver 110 includes a transmitter 112 and a receiver 114. Transceiver 110 may for example operate according to the cdma2000 or WCDMA standards. The present invention, however, is not limited to use with these standards and those skilled in the art will recognize the present invention may be extended or modified for other standards.

System controller 120 provides overall operational control for the mobile station 100 according to programs instructions stored in memory 130. System controller 120 may comprise a microprocessor or microcontroller and may be part of an application specific integrated circuit (ASIC). Memory 130 represents the entire hierarchy of memory in a mobile station 100. Memory 130 provides storage for data, operating system programs and application programs. Memory 130 may be integrated with the system controller, or may be implemented in one or more discrete memory devices. Audio processing circuit 140 processes audio signals transmitted and received by mobile station 100.

User interface 150 typically comprises a keypad 152, display 154, microphone 156 and/or speaker 158. Keypad 152 allows he operator to enter commands and select menu options while display 154 allows the operator to see menu options, entered commands, and other service information. Microphone 156 converts the operator's speech into electrical audio signals for input to audio processing circuits 140. Speaker 158 converts audio signals output from the audio processing circuits 140 into audible signals that can be heard by the operator.

A plurality of mobile stations 100 transmit data frames to the RBS 36 over a reverse link packet data channel. To make communications between the mobile stations 100 and the RBSs 24 more robust and to increase sector throughput, the network 10 implements automatic repeat request (ARQ) at the physical layer. For purposes of this application, ARQ includes hybrid ARQ (HARQ) schemes that combine ARQ and with forward error correction (FEC). When a RBS 36 receives a data frame from a mobile station 100 in error, it sends a negative acknowledgement (NACK) to the mobile station 100 provided that the maximum number of retransmissions has not been reached. Alternatively, the RBS 36 may acknowledge (ACK) good frames. In response to the NACK, or the lack of an ACK, the mobile station 100 retransmits the erroneous frame, typically at the same data transmission rate as the original transmission. In some systems, the mobile station 100 may increase the data transmission rate for the retransmission.

In conventional, wireless communication systems, ACK/NACK indications typically comprise a single bit transmitted over an ACK/NACK channel using binary phase shift keying (BPSK). For example, the RBS 36 may transmit a "1" to acknowledge that a data frame is received without error on the R-PDCH, or a "0" to indicate a frame error. A frame error may be due to a failure to properly decode the R-PDCH frame. Frame errors may also occur when the RBS 36 is unable to decode the corresponding R-PDCCH frame, since the R-PDCCH frame contains information needed to decode the R-PDCH frame. Thus, in conventional CDMA systems, an ACK/NACK bit is transmitted to the mobile station 100 in every frame when the mobile station 100 is transmitting on the reverse link channel.

Figure 4:
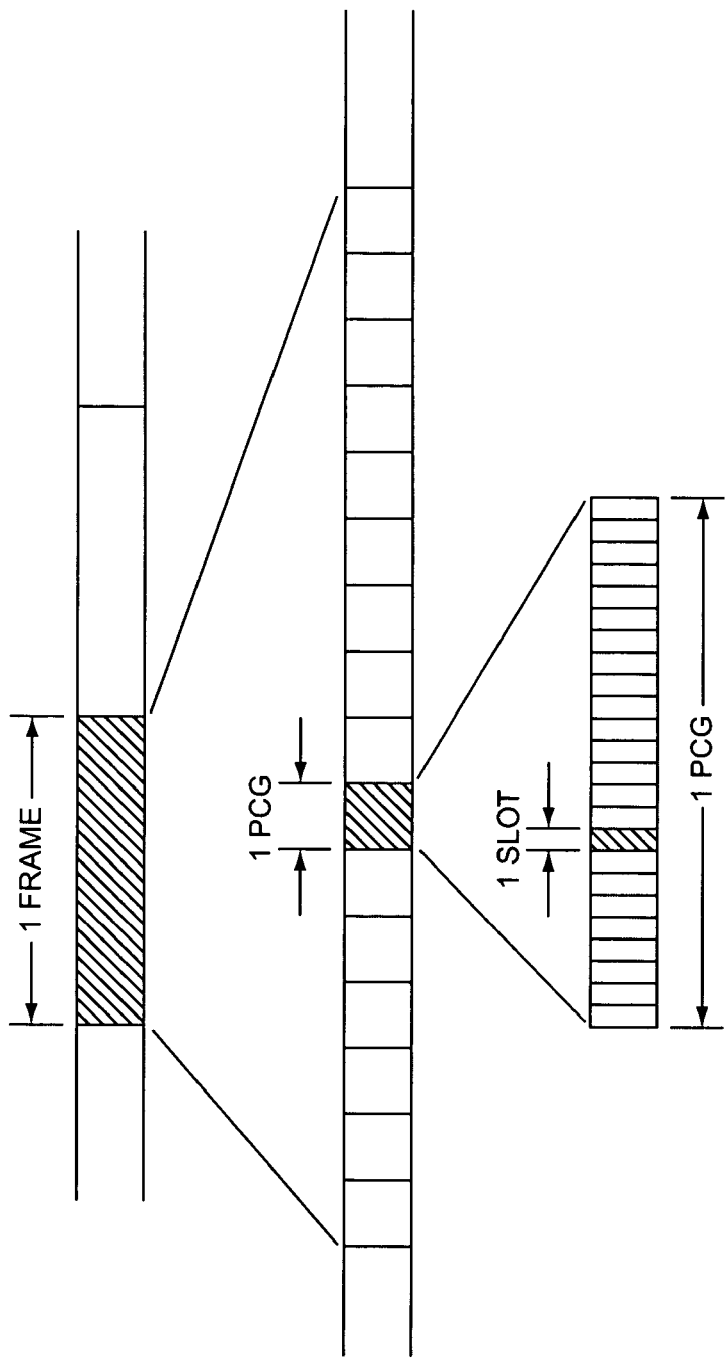
FIG. 4 illustrates the structure of the Forward Common Power Control Channel F-CPCCH.

In one exemplary embodiment of the present invention, an ACK/NACK subchannel is defined as a subchannel of the Forward Common Power Control Channel (F-CPCCH). The F-CPCCH is used by the RBS 36 to send power control commands in the form of power control bits (PCBs). The F-CPCCH is illustrated in FIG. 4. The RBS 36 transmits continuously and at constant power on the F-CPCCH. In Revision D of the cdma2000 standard, the F-CPCCH is organized into 20 ms frames. Each 20 ms frame is further subdivided into sixteen equal time intervals of 1.25 ms each, which are known as power control groups (PCGs). Thus, a single forward link frame has sixteen PCGs. The Reverse Packet Data Channel (R-PDCH) is divided into 10 ms frames and so has eight PCGs per frame. Each PCG includes 24 slots. Each slot contains 1 bit. One slot of each PCG is used to power control one mobile station 100. Thus, the RBS 36 can power control 24 mobile stations 100 at a rate of 800 Hz using a single F-CPCCH.

Figure 5:
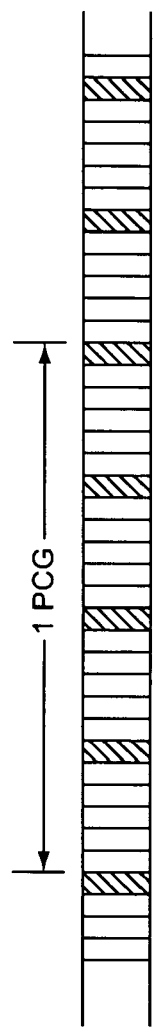
FIG. 5 illustrates a one method of allocating time slots on the F-CPCCH for use as a Forward ACK Subchannel.

The RBS 36 may allocate any number of PCG slots for use as an ACK subchannel. FIG. 5 illustrates an exemplary method of allocating slots on the F-PCCH for use as an ACK subchannel. Other methods may also be employed. In FIG. 5, the RBS 36 has allocated the same slots in each PCG for use as an ACK subchannel. In the specific example, the four slots in each PCG (the 6th, 12th, 18th, and 24th) are allocated to the ACK subchannel. The remaining 20 PCG slots in each PCG may continue to be used for power control. Thus, the RBS 36 may power control up to 20 mobile stations 100 at a rate of 800 Hz without any modification in the power control algorithm of the mobile station 100. The mobile stations 100 need not be aware that some PCG slots are being used for rate control since different PCG slots are allocated for rate control and power control respectively.

In Rev D of the cdma2000 standard, each reverse link frame is 10 msec in length, which comprises 8 PCGs. With four PCG slots allocated to the ACK subchannel, there are 32 bits available for the ACK subchannel per reverse link frame.

Thus, a single ACK subchannel could support up to 32 different mobile stations 100 assuming a single-bit ACK/NACK indication. To support the maximum number of mobile stations 100, the RBS 36 would assign each mobile station 100 to a particular PCG and slot (e.g. 1st PCG, 6th slot). The assignment may be done at call setup or following a handoff.

In practice, it may be desirable to repeat ACK/NACK indications to reduce transmission errors. Repetition improves reliability by taking advantage of time diversity. When repetition is used, the ACK subchannel supports less than the maximum number of mobile stations 100. For example, if each ACK/NACK indication is repeated four times, each ACK subchannel would support 8 mobile stations. Due to processing delays, it may be necessary for the mobile station 100 to receive the ACK/NACK bit at least two PCGs before the next frame.

It has been observed that for many high speed packet data channels where ARQ is employed, the majority of initial transmissions incur a NACK. In some systems, the percentage of initial transmissions incurring a NACK is sometimes as high as 80%. One implication of this observation is that in many wireless communication systems, there will be many more NACKs than ACKs. Therefore, the energy devoted to signaling can be significantly reduced by using ON/OFF keying (OOK) on the ACK subchannel. Using OOK, detected energy above a threshold is considered a first state (referred to as the ON state), while energy below the detected threshold is considered a second state (referred to as the OFF state). The ON state may be represented by the bit "1." The OFF state may be represented by the bit "0." Thus, ACK=ON=1, and NACK=OFF= 0. To perform OOK, the RBS 36 turns its transmitter on to ACK a received frame and turns the transmitter off to NACK a frame. Assuming that there are many more NACKs than ACKs, turning the transmitter off to NACK will conserve energy. If more ACKs than NACKs are expected, the OFF state could be used to ACK the received frame, and the ON state could be used to NACK the received frame.

Figure 6A:
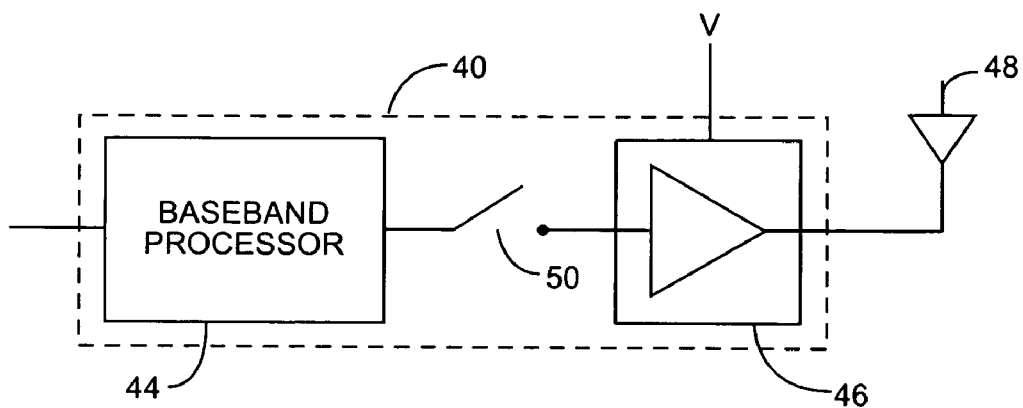
FIG. 6A-6C illustrate gating circuits for selectively gating the transmitter.
Figure 6B:
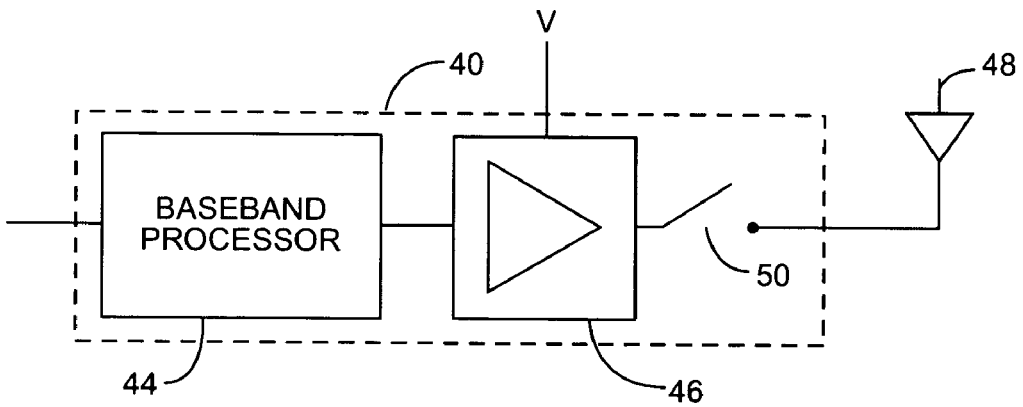
Figure 6C:
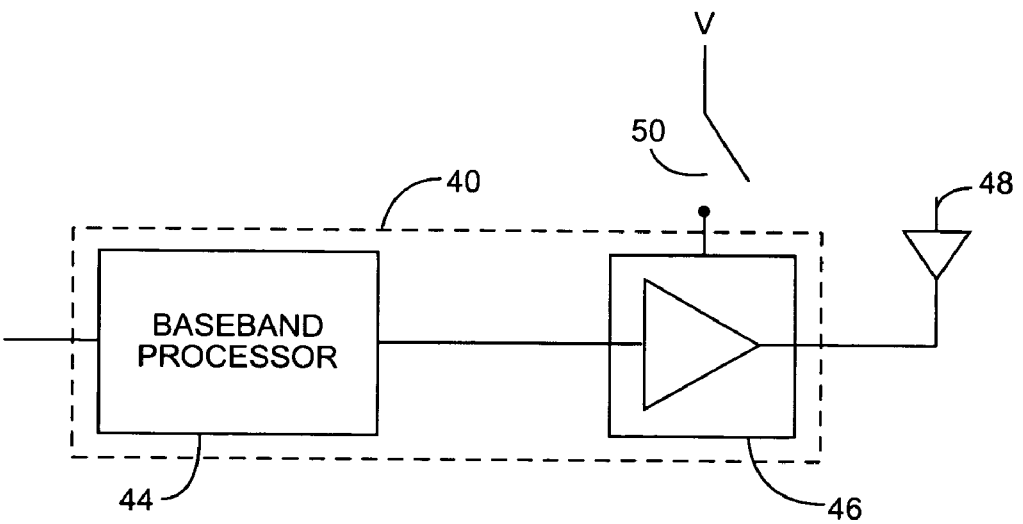

Gating the ACK subchannel ON and OFF may be accomplished in a number of ways. As shown in FIG. 6A through 6C, transmitter 40 includes a baseband processor 44 and power amplifier 46. Signals for transmission are input to the baseband processor 44 and applied to the input of the power amplifier 46. The amplified signals output by the power amplifier 46 are applied to antenna 48 and transmitted to the mobile station 100. In FIG. 6A, a gating circuit 50 is interposed between the baseband processor 44 and power amplifier 46. The gating circuit 50 interrupts the input to the power amplifier 46. In FIG. 6B, the gating circuit 50 is disposed between the output of the power amplifier 46. In FIG. 6C, the gating circuit 50 interrupts the power supply to the power amplifier 46.

Additional energy conservation may be obtained by gating the ACK subchannel off when the mobile station 100 is in an idle state. For purposes of this invention, a mobile state is considered to be in the idle state when it is not transmitting data frames on the R-PDCH. When the mobile station 100 is in the idle state, the RBS 36 may gate the corresponding time slots on the ACK subchannel off to save energy. The mobile station 100 may continue forward link supervision based on the power control bits (PCBs) transmitted to the mobile station 100 on the F-CPCCH. The mobile station 100 in idle state disregards the ACK subchannel but may nevertheless monitor the ACK subchannel for calibration of its detector threshold.

It is possible that some errors may occur in the transmission of the ACK indication on the ACK subchannel. Due to multipath fading, an ACK may be interpreted by the mobile station 100 as a NACK, and vice versa. If an ACK is interpreted as a NACK by a mobile station 100, the mobile station 100 will retransmit the previous frame. When the mobile station is in soft handoff, the mobile station 100 will retransmit the frame only if all sectors in its active set respond with a NACK. The penalty for misinterpretation of an ACK is the transmission of an extra frame, which is less likely to occur when the mobile station 100 has more than one sector in its active set.

A larger penalty occurs if a NACK is misinterpreted as an ACK by the mobile station 100. In this case, the mobile station 100 transmits the next frame and toggles or advances the sequence number. The sequence number is included in all data frames transmitted on the R-PDCH to allow higher layer protocol functions to determine whether the frames are received in sequence. If the mobile station 100 transmits a new frame without the previous frame being correctly received by the RBS 36, the higher layer protocol functions above the physical layer will be invoked to correct the error. The higher layer protocols functions will eventually correct the error, but with a substantial signaling penalty. Therefore, it is desirable to minimize false ACKs.

As noted previously, the exemplary embodiment of the present invention employs repetition to guard against signaling errors on the ACK subchannel. Another measure that may be taken is to increase the detector threshold to require a higher energy level for an ACK signal. Setting the detector threshold to a higher level will decrease the number of false ACKs, but may increase the number of false NACKs. As noted above, false NACKs are mitigated by soft handoff and, in any event, create fewer problems than a false ACK.

Signaling errors on the ACK subchannel may also occur when the mobile station 100 is transitioning between the active and idle states. The mobile station 100 may transition between the active state and idle state autonomously. In autonomous mode, the mobile station 100 transmits a null rate frame to the RBS 36 when it transitions from the active state to the idle state. In a null rate frame, no data is transmitted to the RBS 36 on the R-PDCH, but a control frame containing a rate indicator is transmitted to the RBS 36 on the R-PDCCH. When the mobile station 100 has data to transmit, it simply begins transmitting data frames to the RBS 36 with a corresponding rate indication on the R-PDCCH. After transitioning from the active state to the idle state, the mobile station 100 disregards the ACK subchannel. Any signaling errors that may occur while the mobile station 100 is in the idle state are ignored. When the mobile station 100 transitions back to the active state and the RBS 36 fails to decode the corresponding R-PDCCH frame, it will continue to operate as if the mobile station 100 is in the idle state. If the RBS 36 has gated the ACK subchannel off while the mobile station 100 is in the idle state, the RBS 36 will not transmit an ACK/NACK indication on the ACK subchannel. The failure of the RBS 36 to transmit is equivalent to a NACK, which is the appropriate response if the RBS 36 fails to decode the R-PDCCH. A false ACK may also occur when the mobile station is transitioning from the idle state to the active state. A false ACK when the mobile station 100 is transitioning from the idle state to active state is likely to occur only infrequently. Further, the false ACK can be guarded against by using bit repetition.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A signaling method for automatic repeat request comprising:
receiving data frames from a mobile station at a base station;
selectively gating a physical layer radio channel to provide ACK and NACK indications responsive to the receipt of the data frames from the mobile station, wherein the physical layer radio channel is gated on to provide one of an ACK and a NACK indication to the mobile station, and is gated off to provide the other one of the ACK and NACK indications to the mobile station; and
wherein said physical layer radio channel is a forward common power control channel, and further comprising transmitting power control bits in time-multiplexed power control groups on the forward common power control channel, for power controlling a plurality of mobile stations, and defining an ACK subchannel on the forward common power control channel by allocating a number of power control group slots for sending ACK/NACK indications rather than power control bits, such that said selectively gating the physical layer radio channel to provide ACK and NACK indications responsive to the receipt of the data frames from the mobile station comprises selectively gating the forward common power control on or off as needed for sending an ACK or a NACK to the mobile station at the power control group slots allocated for sending ACK/NACK indications to the mobile station.

2. The signaling method of claim 1 wherein the physical layer radio channel is gated on to provide and ACK indication, and is gated off to provide a NACK indication.

3. The signaling method of claim 1 wherein the physical layer radio channel is gated on to provide a NACK indication, and is gated off to provide an ACK indication.

4. The method of claim 1 further comprising gating off the physical layer channel in the selected time slots on the ACK subchannel while the mobile station is idle.

5. The method of claim 1 further comprising repeating each ACK and NACK indication a predetermined number of times.

6. A radio base station comprising:
a receiver to receive data frames from a mobile station;
a control unit to provide ACK and NACK indications to the mobile station, the control unit selectively gating a physical layer radio channel to provide ACK and NACK indications responsive to the receipt of the data frames from the mobile station, wherein the control unit gates the physical layer radio channel on to provide one of an ACK and a NACK indication to the mobile station and gates the physical layer radio channel off to provide the other one of the ACK and NACK indications to the mobile station; and
wherein said physical layer radio channel is a forward common power control channel, and wherein the radio base station is configured to transmit power control bits in time-multiplexed power control groups on the forward common power control channel, for power controlling a plurality of mobile stations, and wherein the control unit defines an ACK subchannel on the forward common power control channel by allocating a number of power control group slots for sending ACK/NACK indications rather than power control bits, and wherein the control unit selectively gates the physical layer radio channel to provide ACK and NACK indications responsive to the receipt of the data frames from the mobile station by selectively gating the forward common power control on or off as needed for sending an ACK or a NACK to the mobile station at the power control group slots allocated for sending ACK/NACK indications to the mobile station.

7. The radio base station of claim 6 wherein the control unit gates the physical layer radio channel on to provide an ACK indication, and gates the physical layer radio channel off to provide a NACK indication.

8. The radio base station of claim 6 wherein the control unit gates the physical layer radio channel on to provide and NACK indication, and gates the physical layer radio channel off to provide an ACK indication.

9. The radio base station of claim 6 wherein the control unit gates the physical layer channel off in the selected time slots on the ACK subchannel while the mobile station is idle.

10. The radio base station of claim 6 further wherein the control unit repeats each ACK and NACK indication a predetermined number of times.

11. A signaling method for automatic repeat request comprising:
receiving data packets from a mobile station at a base station;
selectively gating a physical layer radio channel to acknowledge data packets received from the mobile station, wherein the physical layer radio channel is gated on to provide one of a positive acknowledgement and a negative acknowledgement and is gated off to provide the other one of the positive acknowledgement and the negative acknowledgment; and
wherein said physical layer radio channel is a forward common power control channel, and further comprising transmitting power control bits in time-multiplexed power control groups on a forward common power control channel, for power controlling a plurality of mobile stations, and defining an ACK subchannel on the forward common power control channel by allocating a number of power control group slots for sending ACK/NACK indications rather than power control bits, and wherein selectively gating the physical layer radio channel to acknowledge data packets received from the mobile station comprises selectively gating the forward common power control on or off as needed for sending an ACK or a NACK to the mobile station at the power control group slots allocated for sending ACK/NACK indications to the mobile station.

12. The method of claim 11 further comprising gating off the physical layer channel in the selected time slots on the ACK subchannel while the mobile station is idle.

13. The method of claim 11 further comprising repeating each ACK and NACK indication a predetermined number of times.

* * * * *

UNITED STATES PATENT AND TRADEMARK OFFICE
CERTIFICATE OF CORRECTION

| | | |
|---|---|---|
| PATENT NO. | : 7,466,666 B2 | Page 1 of 1 |
| APPLICATION NO. | : 10/769010 | |
| DATED | : December 16, 2008 | |
| INVENTOR(S) | : Yoon et al. | |

It is certified that error appears in the above-identified patent and that said Letters Patent is hereby corrected as shown below:

On the Title Page, in Field (54), in Title, in Column 1, Line 2, delete "SYSTEM" and insert -- SYSTEMS --, therefor.

In Column 1, Line 2, delete "SYSTEM" and insert -- SYSTEMS --, therefor.

In Column 2, Line 63, delete "(RBSS)" and insert -- (RBSs) --, therefor.

In Column 8, Line 23, in Claim 10, after "claim 6" delete "further".

Signed and Sealed this

Twenty-seventh Day of October, 2009

David J. Kappos
*Director of the United States Patent and Trademark Office*